(12) United States Patent
Kochersberger

(10) Patent No.: US 6,378,374 B2
(45) Date of Patent: Apr. 30, 2002

(54) APPARATUS FOR TESTING A CONSTANT VELOCITY JOINT AND A METHOD THEREOF

(75) Inventor: Kevin B. Kochersberger, Honeoye Falls, NY (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 09/860,920

(22) Filed: May 18, 2001

Related U.S. Application Data

(60) Provisional application No. 60/205,183, filed on May 18, 2000.

(51) Int. Cl.⁷ .............................................. G01M 13/02
(52) U.S. Cl. .......................................... 73/593; 73/660
(58) Field of Search ........................ 73/593, 659, 660, 73/865.9

(56) References Cited

U.S. PATENT DOCUMENTS

| | | |
|---|---|---|
| 3,745,815 A | 7/1973 | Bentone et al. |
| 3,979,739 A | 9/1976 | Birchall |
| 4,471,444 A | 9/1984 | Yee et al. |
| 4,988,979 A | 1/1991 | Sasaki et al. |
| 5,081,873 A | 1/1992 | Kikuchi et al. ............. 73/865.9 |
| 5,565,623 A | 10/1996 | Philpott et al. ................ 73/105 |
| 5,576,496 A | 11/1996 | Carlini et al. .................. 73/460 |
| 5,995,910 A | 11/1999 | Discenzo ...................... 702/56 |
| 6,138,493 A | 10/2000 | Zeitlin ......................... 73/1.01 |

Primary Examiner—John E. Chapman
(74) Attorney, Agent, or Firm—Nixon Peabody LLP

(57) ABSTRACT

An apparatus for testing at least one joint includes an articulation device and a defect detection system. The first joint being tested has an inner race rotatably mounted within an outer race, a driving shaft connected to either the inner race or outer race, and a load bearing shaft connected to the other one of the inner race or outer race. The articulation device connects to the driving shaft and articulates the driving shaft to articulate the first outer race with respect to the first inner race without rotating the driving and load bearing shafts. The defect detection system detects first signals from the first joint during the articulation of the first outer race with respect to the first inner race and determines if there is a defect in the first joint based on the detected first signals.

26 Claims, 4 Drawing Sheets

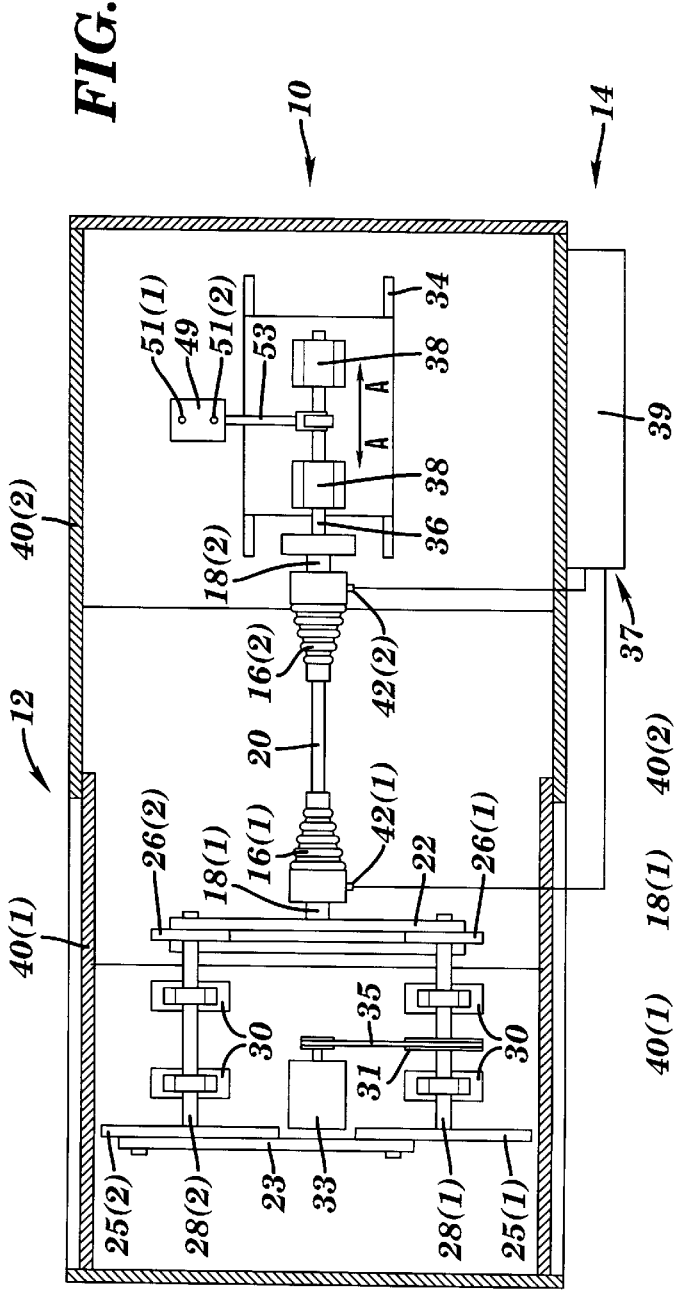
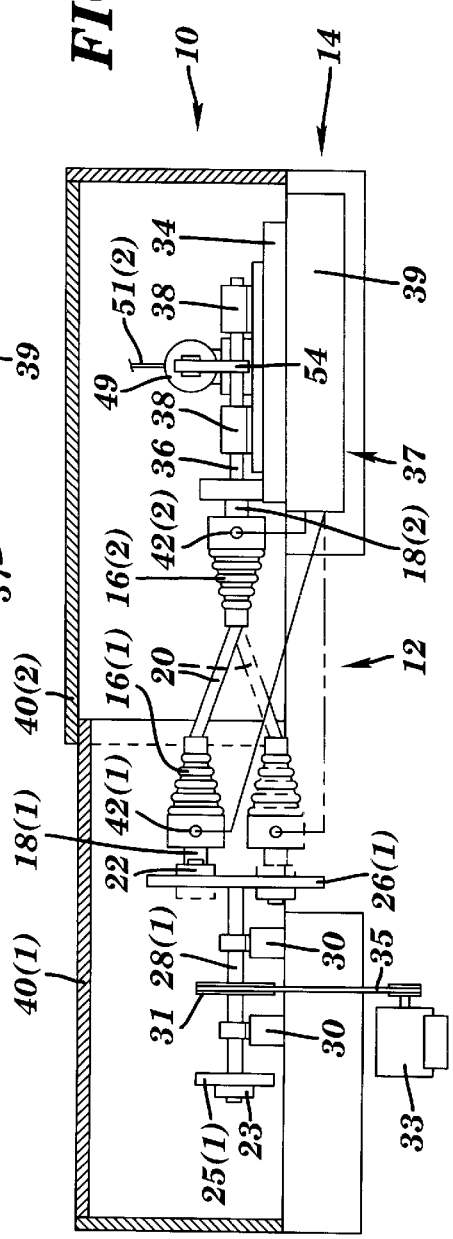

APPARATUS FOR TESTING A CONSTANT VELOCITY JOINT AND A METHOD THEREOF

This application claims the benefit of U.S. Provisional Patent Application Ser. No. 60/205,183, filed on May 18, 2000, which is herein incorporated by reference.

FIELD OF THE INVENTION

The present invention relates generally to testing apparatuses and methods and, more particularly, to an apparatus for testing a constant velocity ("CV") joint and a method thereof.

BACKGROUND OF THE INVENTION

Referring to FIG. 1, a bell-type CV Rzeppa joint 5 is illustrated. The joint 5 is made up of a spherical housing, also referred to as the outer race 6, an inner race 7 containing six longitudinally oriented grooves in which ball bearings travel, six ball bearings 8, and a cage 9 that holds the balls in place. The outer and inner races 6 and 7 are grooved to guide the ball bearings 8 along a spherical path that is oriented in the axial direction. The spherical path of the grooves allows an articulation angle between the inner and outer races 6 and 7 to occur while torque is transmitted through the ball bearings 8.

An input shaft 11 is typically attached to either the outer race 6 or the inner race 7, and an output shaft 13 is attached to the remaining outer race 6 or inner race 7 which is not connected to the input shaft 11 and which is also connected to the load. When input torque is applied at constant velocity, the CV joint 5 transmits an output torque at a constant velocity over a range of angles between the input and output shafts 11 and 13.

CV joints are frequently used in automotive applications, particularly in front-wheel drive cars. In an automotive application, one CV joint is typically mounted to each end of an axle, forming a "CV joint-axle-CV joint" combination commonly called the "half shaft." One end of the half shaft mounts to the transmission output flange and the opposite end mounts to the wheel axle. This assembly allows the wheel to move up and down through its range of suspension travel and also allows a steering angle to be applied, all while the wheel is being driven.

For a variety of different reasons, such as wear or accidents, a CV joint may need to be replaced by either a new or a remanufactured CV joint. Since the cost of a remanufactured CV joint can be about 1/10 the cost of a new CV joint, there is a large demand for these remanufactured units. Currently, the industry has no effective mechanism for evaluating remanfactured CV joints. As a result, defective remanufactured CV joints are sometimes distributed and sold.

Typically, the damage associated with CV joints is a scoring or failure of the ball bearing surface or the race. This failure mode results in a nonsmooth bearing surface which causes vibration-induced noise to occur when the CV joint is operated. This noise is an indication of the high stresses and heat that are generated in the bearing which eventually leads to a catastrophic failure of the joint. Noise is also a reliable indication of CV joint health as disclosed in R. Dunn, "A Study of Signature Analysis Regarding A Rzeppa Type Constant Velocity Joint" Master Thesis, Rochester Institute of Technology, 2000 which is herein incorporated by reference. Therefore, detection of CV joint noise is tantamount to detecting CV joint damage.

To test a CV joint, prior testing devices require a rotation and movement of the CV joint similar to the action it would see when installed in a vehicle. Unfortunately, one of the problems with these prior testing devices is that some energy dissipative device must be incorporated to apply a torque. This leads to high power consumption in the drive system and the generation of mechanical and electrical noise that can interfere with detecting signals used to evaluate the CV joint. Additionally, the high torque loads used by these prior testing devices are not easy to accurately control, compounding the difficulty of obtaining clean data about the CV joint. Further, the rotation of the CV joint makes it difficult to place sensors on the CV joint requiring the use of non-contacting, telemetry or slip rings to detect failures which also complicates obtaining data about the CV joint.

One prior design for a device for testing CV-joints consisted of a motor driving a torque brake with the CV joint mounted as a link in the drivetrain, as disclosed in Dunn, R., Masters Thesis, "A Study of Signature Analysis Regarding A Rzeppa Type Constant Velocity Joint," Rochester Institute of Technology, 2000 which has already been incorporated in by reference. By mounting the torque brake (a magnetic particle brake in this case) on a pivot, a range of operating angles could be induced in the CV joint. Torque levels were limited by the power of the motor and energy dissipation capacity of the brake. The CV-joint condition was determined by monitoring acoustic emissions from a rotating and articulated CV joint using as audio sensor (microphone). In this particular design, the microphone was not an effective diagnostic tool because of the considerable background noise that needed to be filtered out. This prior design also had two qualities that made it prohibitive as a commercial product. First, it is time consuming to place the CV joint in the testing device and second, the size and operating cost of the motor and dynamometer threatens to outweigh the benefits of the machine in a commercial environment.

SUMMARY OF THE INVENTION

An apparatus for testing at least one joint in accordance with one embodiment of the present invention includes an articulation device and a defect detection system. A first joint being tested has an inner race rotatably mounted within an outer race, a driving shaft connected to either the inner race or outer race, and a load bearing shaft connected to the other one of the inner race or outer race. The articulation device connects to the driving shaft and articulates the driving shaft to articulate the first outer race with respect to the first inner race without rotating the driving and load bearing shafts. The defect detection system detects first signals from the first joint during the articulation of the first outer race with respect to the first inner race and determines if there is a defect in the first joint based on the detected first signals.

A method for testing at least one joint in accordance with another embodiment of the present invention includes a few steps. The joint has a first inner race rotatably mounted within a first outer race, a first driving shaft connected to one of the first inner and outer races, and a load bearing shaft connected to the other one of the first inner and outer races. The first outer race is articulated with respect to the first inner race without rotating the driving and load bearing shafts. First signals from the joint are detected during the articulation of the first outer race with respect to the first inner race. The detected first signals are used to determine if there is a defect in the joint.

The present invention provides a testing apparatus and method that can effectively quantify the condition of a CV-joint to determine if it is salvageable, scrap, or within operating specifications. The present invention can also be used to test new or remanufactured CV-joints to failure to gain a greater understanding of failure mechanisms.

One of the features of the present invention is the articulation of the CV joint through its full range of motion without any rotation of the shafts connected to the CV joint. By eliminating the rotation, the detection instrumentation or sensors may be placed directly on the CV joint. This enables the sensors to more accurately capture signals used to evaluate the condition of the CV joint. The elimination of the rotation of the shafts also eliminates the background noise associated with this motion which further enhances the ability of the detection instrumentation or sensors to pick up the signals of interest. Further, the power requirements are reduced because power is only needed to articulate, not rotate the shafts connected to the CV joint.

Another feature of the present invention is more accurate torque control. The present invention applies torque while articulating CV-joints in a controlled environment. This capability, when coupled with speed and acceleration data, is used to determine various faults, quality of a joint, and the life of a CV joint through accelerated wear testing. With the present invention, none of the torque applied to the CV joint is transferred to the drive system. Therefore, the drive motor and drive system may be kept small and inexpensive.

Further, the present invention can be adjusted to accommodate the size requirements and range of motion requirements for a variety of different types of joints. With these adjustments, any CV joint can be put through its full range of motion so that all race and ball defects may be realized.

BRIEF DESCRIPTION OF THE DRAWINGS

FIG. 3 is a partially cross-sectional top view of the apparatus for testing a CV joint shown in FIG. 2;

FIG. 4 is a partially cross-sectional side view of the apparatus shown in FIG. 2.

DETAILED DESCRIPTION

Figure 1:
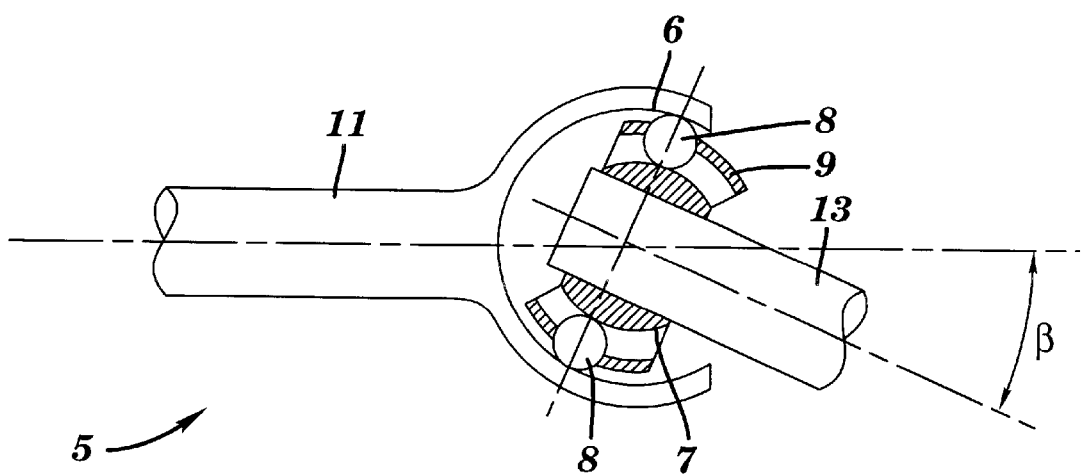
FIG. 1 is a cross-sectional view of a CV joint.
Figure 2:
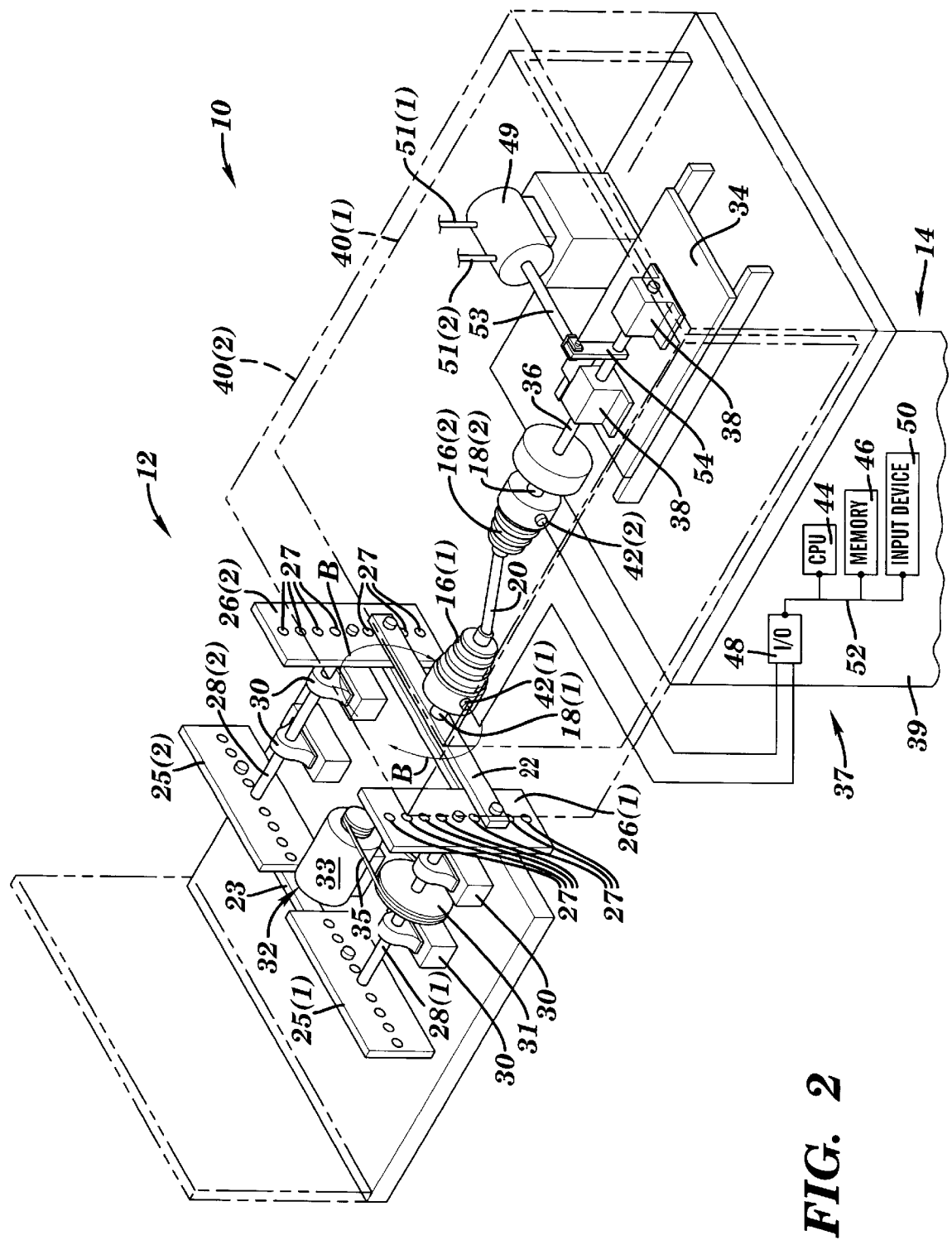
FIG. 2 is a perspective view of an apparatus for testing a CV joint in accordance with one embodiment of the present invention.
Figure 5:
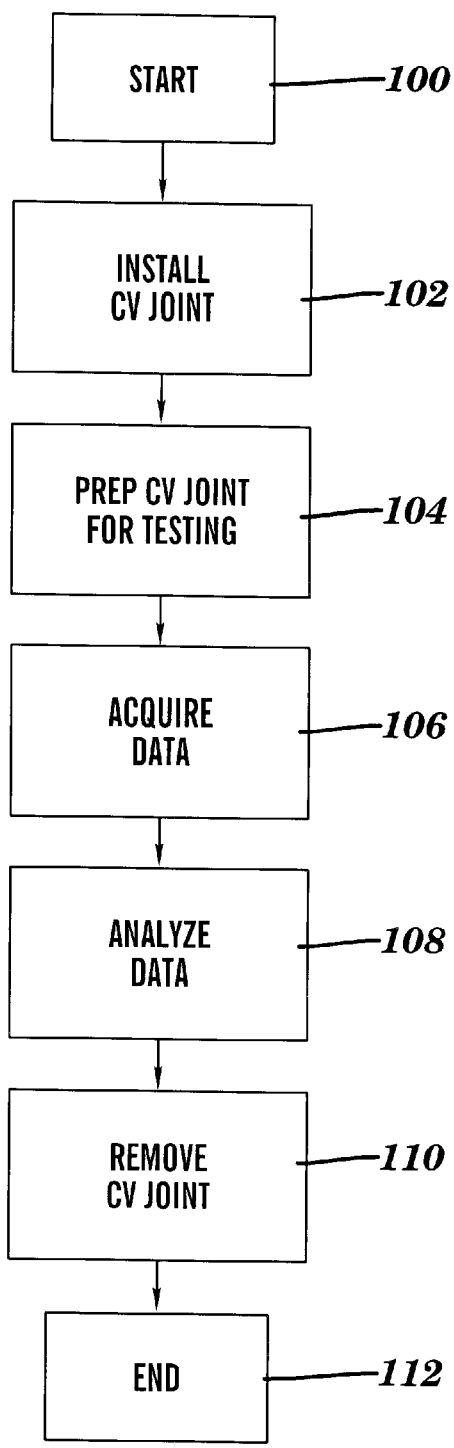
FIG. 5 is a flow chart of a method for testing a CV joint in accordance with another embodiment of the present invention.

An apparatus 10 for testing a joint in accordance with one embodiment of the present invention is illustrated in FIGS. 2–4. The apparatus 10 includes an articulation system 12 and a defect detection system 14 and the method includes articulating the joint without rotating a shaft connected to the joint, detecting signals from the joint during the articulation, and determining if there is a defect in the joint based on the detected first signals. The present invention provides a number of advantages including providing a testing apparatus 10 and method that can effectively quantify the condition of a CV-joint.

Referring to FIGS. 2–4, in this particular embodiment a pair of CV joints 16(1) and 16(2) are tested, although the apparatus 10 can be used to test other types and numbers of joints, such as just one joint or more than two joints. In this example, the CV joints 16(1) and 16(2) being tested each have their own load bearing shaft 18(1) and 18(2) and share a common drive shaft 20, although a joint or joints with other configurations can also be tested.

In this particular embodiment, the articulation system 12 includes a drive link 22, a support link 23, a pair of plates 25(1) and 25(2), a pair of cranks 26(1) and 26(2), a pair of articulation shafts 28(1) and 28(2) and rotational supports 30, a driving system 32, a movable block 34, a block shaft 36, rotation supports 38, a nested housing 40(1) and 40(2), an air cylinder 49, a rod 53, and a lever 54. Although one example of an articulation system 12 is shown, a variety of different types of articulation system 12 which can articulate the joint or joints being tested without or with little substantial rotation of the shafts connected to the joint or joints can be used.

The drive link 22 is connected between two cranks 26(1) and 26(2). One end of a load bearing shaft 18(1) for one of the CV joints 16(1) attaches to the center of the drive link 22. During testing the drive link 22 is moved in a circular path (shown by the arrows B in FIG. 2) which articulates or moves the load bearing shaft 18(1) and thus the CV joint 16(1), without rotating the load bearing shaft 18(1) or the drive shaft 20 of the CV joint 16(1).

Each of the cranks 26(1) and 26(2) has a plurality of apertures 27. In this example, the cranks 26(1) and 26(2) are symmetrical for balancing purposes. The ends of the drive link 22 are connected to the cranks 26(1) and 26(2) via bolts or other securing devices which extend through one of the apertures 27 in each of the cranks 26(1) and 26(2). Depending on the particular aperture 27 selected, the drive link 22 can be positioned a variety of distances away from the center of the cranks 26(1) and 26(2). As a result, the range of motion to be applied to the CV joints 16(1) and 16(2) during testing can be adjusted to the particular CV joint or joints being tested. Different joints have different testing requirements in terms of the range of motion.

The articulation shafts 28(1) and 28(2) are rotatably seated within rotational supports 30 in the housing. One end of each of the articulation shafts 28(1) and 28(2) is connected to one of the cranks 26(1) and 26(2). When the articulation shafts 28(1) and 28(2) are rotated, the cranks 26(1) and 26(2) connected to the articulation shafts 28(1) and 28(2) rotate and translate this motion to the drive link 22.

Each of the plates 25(1) and 25(2) are secured to another end of the articulation shafts 28(1) and 28(2) and are offset from the position of the cranks 26(1) and 26(2) by ninety degrees in this example. A support link 23 is connected between the plates 25(1) and 25(2). The support link 23 absorbs the torque at this end of the apparatus 10.

The driving system 32 is connected to one of the articulation shafts 28(1). In this particular embodiment, the driving system 32 includes a motor 33 which is coupled to one of the articulation shafts 28(1) via a belt 35 and a drive pulley 31 rotatably seated on the articulation shaft 28(1), although a variety of different types of driving systems can be used. When the driving system 32 is engaged, the driving system 32 rotates the articulation shaft which rotates the cranks 26(1) and 26(2). One of the features of the present invention is that a low power motor can be used because rotation of the shafts of the CV joint are unnecessary for testing purposes. The use of a low power motor reduces noise which is highly desirable because the signals related to damage being detected are small.

The movable block 34 is seated on tracks in the housing. The position of the movable block 34 on the tracks of the housing can be adjusted in the direction indicated by arrows A—A to accommodate the CV joint or joints with different lengths of shafts. One end of the load bearing shaft 18(2) for the CV joint is also coupled to a block shaft 36 on the movable block 34. A variety of different mechanisms can be used to couple the end of the load bearing shaft 18(2) for the CV joint 16(2) to the block shaft 36. The block shaft 36 is rotatably mounted on rotational supports 38 on the movable block 34. The movable block 34 coupled to the load bearing shaft 18(2) via the block shaft 36.

The air cylinder 49 receives and discharges air via air hoses 51(1) and 51(2). The rod 53 is movable in to and out from the air cylinder 49. The lever is pivotally connected at one end to the rod 53 and is connected at the other end to block shaft 36. The motion of rod 53 in to and out of air cylinder 49 moves lever 54. The movement of lever 54 moves block shaft 36 which imparts a torque to the joints 16(1) and 16(2) via block shaft 36. Although one embodiment of a system for imparting torque on the joints 16(1) and 16(2) is illustrated, a variety of different system for imparting torque on the joints 16(1) and 16(2) can be used.

An optional nested housing 40(1) and 40(2) is positioned over the articulation system 12. In this particular embodiment, the nested housing has two portions 40(1) and 40(2), although the housing could be comprise more or fewer sections. The nested housing 40(1) and 40(2) can be moved to cover or expose the CV joint or joints 16(1) and 16(2) in this example being tested and the articulation system 12. The housing 40 is typically closed for safety reasons. Closing the housing 40 may also help to keep out extraneous noises which might be picked up by the sensors on the CV joint or joints 16(1) and 16(2) and which might effect the quality of the evaluation.

In this particular embodiment, the detection system 37 includes a detection processing system 39 and sensors 42(1) and 42(2) for each of the CV joints 16(1) and 16(2). Although one example of a detection system 37 is shown, a variety of different types of detection systems which can obtain signals from a CV joint as the CV joint is being articulated and which can process those signals to evaluate the CV joint can be used.

In this particular embodiment, each sensor 42(1) and 42(2) is an accelerometer which is used to measure the defect-induced vibration, although other types of sensors, such as an audio sensor, which can detect signals during the articulation of the CV joint or joints 16(1) and 16(2), in this example, can be used. Since the joints 16(1) and 16(2) are not rotating, the sensor 42(1) and 42(2) can be directly mounted to the joints 16(1) and 16(2). This eliminates the need for special equipment, such as slip rings or telemetry, required by prior testing devices where the joint is rotated. Eliminating this special equipment lowers the overall cost of apparatus 10 and also reduces the chance of contaminating the detected signal from the CV joint with non-damage related noise. Additionally, the direct mounting on the CV joints 16(1) and 16(2) greatly increases the signal-to-noise ratio. As a result, most, if not all, damage-induced vibration will be detected by the sensor and very little background noise will be detected. Multiple sensors can be mounted on each of the joints 16(1) and 16(2) to obtain position-dependent information.

The detection processing system 39 includes a processor (CPU) 44, a memory 46, an input/output interface 48, and a user input device 50 which are coupled together by a bus system 52 or other link, although the detection processing system may comprise other components, other numbers of the components, and other combinations of the components. The processor 44 executes a program of stored instructions for the method for testing or evaluating at least one joint in accordance with one embodiment of the present invention as described herein and in FIG. 6. In this particular embodiment, those programmed instructions are stored in memory 46, although some or all could be stored and retrieved from other locations. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 44, can be used for memory 46. The input/output interface 48 is used to operatively couple and communicate between the detection processing system 39 and sensors 42(1) and 42(2). In this particular embodiment, the connection is shown as a hard wire connection, although a variety of different types of connections and communication techniques can be used to transmit signals from the sensors 42(1) and/or 42(2) to the detection processing system 39 and/or from the detection processing system 39 to the sensors 42(1) and/or 42(2). The user input device 50 enables an operator to generate and transmit signals or commands to the processor. A variety of different types of user input devices can be used, such as a keyboard or computer mouse.

The operation of the apparatus 10 for testing CV joints 16(1) and 16(2) will be described with reference to FIGS. 2–5. In step 100, a method for testing at least one joint, such as a CV joint, in accordance with one embodiment of the present invention begins. In this particular example CV joints 16(1) and 16(2) with load bearing shafts 18(1) and 18(2) and common drive shaft 20 will be tested, although other types and numbers of joints can be tested. One of the features of the invention is that multiple joints can be evaluated at the same time.

Next, in step 102 the CV joints 16(1) and 16(2) are installed in the apparatus 10. More specifically, in this particular example the portion 40(1) of the housing is slid or nested back in with the portion 40(2) of the housing to open up the apparatus 10. Next, the location of drive link 22 on the cranks 26(1) and 26(2) may be adjusted by using different apertures 27 to secure the drive link 22 on the cranks 26(1) and 26(2). Adjusting the location of the drive link 22 changes the articulation angle at which a particular joint or joints may be tested at so that each joint can be tested through its full range of motion.

Continuing in step 102, block 34 may be adjusted along the tracks in the direction of arrows A to accommodate the particular length of the joint or CV joints 16(1) and 16(2) in this example being tested. Once the block 34 is adjusted, load bearing shaft 18(1) is attached to drive link 22 and load bearing shaft 18(2) is coupled to block shaft 36. Next, sensor 42(1) is attached directly to CV joint 16(1) and sensor 42(2) is attached directly to CV joint 16(2).

Next, in step 104 the joints 16(1) and 16(2) are prepared for testing by applying torque to the joints 16(1) and 16(2). Applying the torque to the joints 16(1) and 16(2) can be accomplished in a variety of different ways. In this particular embodiment, torque is applied by turning on air pressure to air cylinder 49 via hose 51(1) or hose 51(2). Drawing air into and out of air cylinder 49 via hoses 51(1) and 51(2), moves rod 53 into and out of air cylinder 49. Movement of rod 53 also moves lever 54 which moves block shaft 36 and applies torque to joint 16(2).

Continuing in step 104, the portion 40(1) of the housing is slid or nested back out from the portion 40(2) of the housing to close the apparatus 10 in this particular example. Once the housing 40 is closed, then the motor 33 is engaged to rotate articulation shaft 28(1) via belt 35 and pulley 31. The rotation of shaft 28(1) rotates the cranks 26(1) and 26(2) which rotates or oscillates the drive link 22 in the a circular path shown by arrows B. The rotation of drive link 22 articulates the load bearing shaft 18(1) of joint 16(1) and of drive shaft 20 of joint 16(2). The articulation system 12 does not rotate either of the joints 16(1) and 16(2) or the load bearing or drive shafts 18(1), 18(2), or 20. This is advantageous because sensors 42(1) and 42(2), such accelerometers used to measure the defect-induced vibration, can be directly mounted to the joints 16(1) and 16(2) without the use of special equipment designed for rotating systems. In this particular embodiment, each of the joints 16(1) and 16(2) is articulated through their full range of motion relative to one another without a spinning rotation that would be found during a normal operation.

Next, in step 106 the sensors 42(1) and 42(2) detect data or signals emitted from the joints 16(1) and 16(2) as the joints 16(1) and 16(2) are being articulated. With no rotation, data acquisition to evaluate joints 16(1) and 16(2) is greatly simplified. For example, data and signal collection is enhance by eliminating the rotation because the sensors 42(1) and 42(2) can be directly mounted on the joints 16(1) and 16(2) and the absence of rotation reduces the amount of background noise which may be picked up by the sensors 42(1) and 42(2). In this particular embodiment, about thirty seconds of data is acquired for each joint 16(1) and 16(2), although the amount of data acquired can vary as necessary for the particular application. This data is transmitted from sensors 42(1) and 42(2) to detection processing system 39.

Next in step 108 the data or signals detected by sensors 42(1) and 42(2) are analyzed to evaluate the joints 16(1) and 16(2). By way of example only, detection processing system 39 may conduct a frequency domain analysis of the detected data or signals from joints 16(1) and 16(2) during the articulation can reveal patterns which are indicative of specific failure modes. In another example, to quantify any damage in a joint 16(1) and/or 16(2), detection processing system 39 may compare the detected signals from each joint 16(1) and 16(2) against stored signals that are indicative of damaged and undamaged joints. This technique is commonly referred to as signature analysis. In yet another example, the detection processing system 39 may be programmed to execute instructions to: determine the kurtosis of each of the detected signals: determine how many of the detected signals have a kurtosis which exceeds a threshold level from a source, such as from memory 46 or entered by an operator using input device 50 (the threshold level can be adjusted as needed or desired for the particular application); and then compare the total number of detected signals with a kurtosis that exceeded the threshold level against a set limit also from a source, such as from memory 46 or entered by an operator using input device 50 (the set limit can also be adjusted as needed or desired for the particular application). If the total number exceeds the set limit, then the detection processing system 39 signals that the joint 16(1) and/or 16(2) is bad and if the total number does not exceed the set limit, then the detection processing system 39 signals the joint 16(1) and/or 16(2). The detection processing system 39 may signal the status of each of the tested joints in a variety of different manners, such as on a display screen, printed on a paper in a printer, or stored in memory for retrieval at a later time.

Next, in step 110 the portion 40(1) of the housing is slid or nested back in with the portion 40(2) of the housing to open up the apparatus 10 and the joints 16(1) and 16(2) are removed. The above process is then repeated if there is another joint or joints to be tested. If there is not more testing, then in step 112 the method ends.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed:

1. A method for testing at least one joint, the joint comprising a first inner race rotatably mounted within a first outer race, a first driving shaft connected to one of the first inner and outer races and a load bearing shaft connected to the other one of the first inner and outer races, the method comprising:

articulating the first outer race with respect to the first inner race without rotating the driving and load bearing shafts;

detecting first signals from the joint during the articulating of the first outer race with respect to the first inner race; and determining if there is a defect in the joint based on the detected first signals.

2. The method as set forth in claim 1 further comprising applying a torque to the load bearing shaft.

3. The method as set forth in claim 1 wherein a first angle at which the articulating is applied is adjustable.

4. The method as set forth in claim 1 wherein the detecting first signals from the joint comprises detecting vibration signals from the joint during the articulating, wherein the determining if there is a defect in the joint is based on the detected vibration signals.

5. The method as set forth in claim 1 wherein the detecting first signals from the joint comprises detecting sound signals from the joint during the articulating, wherein the determining if there is a defect in the joint is based on the detected sound signals.

6. The method as set forth in claim 1 wherein the determining if there is a defect in the joint based on the detected first signals further comprises using a time or frequency domain analysis on the detected first signals to identify the defect in the joint.

7. The method as set forth in claim 1 further comprising:

articulating a second outer race with respect to a second inner race of another joint without rotating the driving and load bearing shafts at substantially the same time as the articulating the first outer race with respect to the first inner race;

detecting second signals from the another joint during the articulating a second outer race with respect to a second inner race; and determining if there is a defect in the joint based on the detected second signals.

8. An apparatus for testing at least one joint, the joint comprising an inner race rotatably mounted within an outer race, a driving shaft connected to one of the inner and outer races and a load bearing shaft connected to the other one of the inner and outer races, the apparatus comprising:

an articulation device that connects to the driving shaft, the articulation device articulates the driving shaft to articulate the first outer race with respect to the first inner race without rotating the driving and load bearing shafts; and a defect detection system that detects first signals from the joint during the articulation of the first outer race with respect to the first inner race and determines if there is a defect in the joint based on the detected first signals.

9. The apparatus as set forth in claim 8 further comprising a system for applying a torque to the load bearing shaft.

10. The apparatus as set forth in claim 8 wherein the articulation device further comprises:
   at least one articulation shaft;
   a driving system that rotates the articulation shaft; and
   at least one driving arm connected to the articulation shaft and to the driving shaft of the joint and which translates rotational motion of the articulation shaft to the articulation of the driving shaft of the joint without rotating the driving shaft of the joint.

11. The apparatus as set forth in claim 10 wherein the connection of the driving shaft to the driving arm is adjustable so that an angle of the articulation of the driving shaft is adjustable.

12. The apparatus as set forth in claim 8 wherein the detection system further comprises an accelerometer that detects vibration signals from the joint during the articulation, wherein the detection system determines if there is a defect in the joint is based on the detected vibration signals.

13. The apparatus as set forth in claim 8 wherein the defect detection system further comprises a microphone that that detects sound signals from the joint during the articulation, wherein the detection system determines if there is a defect in the joint is based on the detected sound signals.

14. The apparatus as set forth in claim 8 wherein:
   the articulation device articulates a second outer race with respect to a second inner race of another joint without rotating the driving and load bearing shafts at substantially the same time as the articulating the first outer race with respect to the first inner race; and
   the defect detection system detects second signals from the another joint during the articulation of the second outer race with respect to the second inner race and determines if there is a defect in the another joint based on the detected second signals.

15. A method for testing at least one joint, the joint comprising a first inner race rotatably mounted within a first outer race, a first driving shaft connected to one of the first inner and outer races and a load bearing shaft connected to the other one of the first inner and outer races, the method comprising:
   articulating the first outer race with respect to the first inner race without rotating the joint;
   applying a torque to the joint;
   detecting first signals from the joint during the articulating of the first outer race with respect to the first inner race; and
   identifying any defects in the joint based on the detected first signals.

16. The method as set forth in claim 15 wherein a first angle at which the articulating is applied is adjustable.

17. The method as set forth in claim 15 wherein the detecting first signals from the joint comprises detecting vibration signals from the joint during the articulating, wherein the determining if there is a defect in the joint is based on the detected vibration signals.

18. The method as set forth in claim 15 wherein the detecting first signals from the joint comprises detecting sound signals from the joint during the articulating, wherein the determining if there is a defect in the joint is based on the detected sound signals.

19. The method as set forth in claim 15 wherein the determining if there is a defect in the joint based on the detected first signals further comprises using a time or frequency domain analysis on the detected first signals to identify the defect in the joint.

20. The method as set forth in claim 15 further comprising:
   articulating a second outer race with respect to a second inner race of another joint without rotating the driving and load bearing shafts at substantially the same time as the articulating the first outer race with respect to the first inner race;
   detecting second signals from the another joint during the articulating a second outer race with respect to a second inner race; and
   determining if there is a defect in the joint based on the detected second signals.

21. An apparatus for testing at least one joint, the joint comprising an inner race rotatably mounted within an outer race, a driving shaft connected to one of the inner and outer races and a load bearing shaft connected to the other one of the inner and outer races, the apparatus comprising:
   an articulation device that articulates the first outer race with respect to the first inner race without rotating the joint;
   a torque system that applies torque to the joint; and
   a defect detection system that detects first signals from the joint during the articulation of the first outer race with respect to the first inner race and identifies any defects in the joint based on the detected first signals.

22. The apparatus as set forth in claim 21 wherein the articulation device further comprises:
   at least one articulation shaft;
   a driving system that rotates the articulation shaft; and
   at least one driving arm connected to the articulation shaft and to the driving shaft of the joint and which translates rotational motion of the articulation shaft to the articulation of the driving shaft of the joint without rotating the driving shaft of the joint.

23. The apparatus as set forth in claim 21 wherein the connection of the driving shaft to the driving arm is adjustable so that an angle of the articulation of the driving shaft is adjustable.

24. The apparatus as set forth in claim 21 wherein the detection system further comprises an accelerometer that detects vibration signals from the joint during the articulation, wherein the detection system determines if there is a defect in the joint is based on the detected vibration signals.

25. The apparatus as set forth in claim 21 wherein the defect detection system further comprises a microphone that that detects sound signals from the joint during the articulation, wherein the detection system determines if there is a defect in the joint is based on the detected sound signals.

26. The apparatus as set forth in claim 21 wherein:
   the articulation device articulates a second outer race with respect to a second inner race of another joint without rotating the another joint at substantially the same time as the articulating the first outer race with respect to the first inner race; and
   the defect detection system detects second signals from the another joint during the articulation of the second outer race with respect to the second inner race and identifies any defects in the another joint based on the detected second signals.

* * * * *